United States Patent
Sato et al.

(10) Patent No.: US 8,927,678 B2
(45) Date of Patent: Jan. 6, 2015

(54) CRYSTALLINE THERMOPLASTIC POLYIMIDE RESIN

(71) Applicant: Mitsubishi Gas Chemical Company, Inc., Tokyo (JP)

(72) Inventors: Yuuki Sato, Hiratsuka (JP); Jun Mitadera, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 14/233,920

(22) PCT Filed: Feb. 5, 2013

(86) PCT No.: PCT/JP2013/052572
§ 371 (c)(1),
(2) Date: Jan. 21, 2014

(87) PCT Pub. No.: WO2013/118704
PCT Pub. Date: Aug. 15, 2013

(65) Prior Publication Data
US 2014/0200325 A1     Jul. 17, 2014

(51) Int. Cl.
C08G 75/00     (2006.01)
C08G 73/10     (2006.01)
C08G 63/00     (2006.01)

(52) U.S. Cl.
CPC ............ C08G 73/1046 (2013.01); C08G 73/10 (2013.01); C08G 73/1042 (2013.01)
USPC ....... 528/188; 428/64.4; 428/458; 428/473.5; 528/196; 528/198; 528/322; 528/353

(58) Field of Classification Search
USPC .............. 428/64.4, 458, 473.5; 528/196, 198, 528/322, 353
See application file for complete search history.

(56) References Cited

FOREIGN PATENT DOCUMENTS

| JP | 62-236858 | 10/1987 |
|---|---|---|
| JP | 6-157751 | 6/1994 |
| JP | 2530919 | 6/1996 |
| JP | 2002-206057 | 7/2002 |
| JP | 2004-83814 | 3/2004 |
| JP | 2005-028524 | 2/2005 |
| JP | 2009-114439 | 5/2009 |
| JP | 2009-221392 | 10/2009 |
| JP | 2012-193281 | 10/2012 |

OTHER PUBLICATIONS

AURUM, Technical Information, G-06.
Journal of Polymer Science: Part A: Polymer Chemistry, Rapid Communication, "A new facile and rapid synthesis of aliphatic polypyromellitimides by microwave-assisted polycondensation of salt monomers composed of aliphatic diamines and pyromellitic acid" vol. 34, 1996, pp. 701-704.
Macromolecular Rapid Communications, "The nucleating effect of carbon nanotubes on crystallinity in R-BAPB-type thermoplastic polyimide", 26, 2005, pp. 885-888.
International Search Report issued May 7, 2013 in application No. PCT/JP2013/052572.
Mitsui Chemicals Inc., Plastics, vol. 52, No. 2, p. 95, 2001.

*Primary Examiner* — Terressa Boykin
(74) *Attorney, Agent, or Firm* — Oblon, Spivak, McClelland, Maier & Neustadt, L.L.P.

(57) ABSTRACT

A thermoplastic polyimide resin containing a repeating structural unit represented by the following formula (1) and a repeating structural unit represented by the following formula (2), a content ratio of the repeating structural unit of formula (2) with respect to the total of the repeating structural unit of formula (1) and the repeating structural unit of formula (2) being from 40 to 70% by mol:

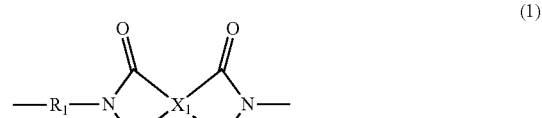

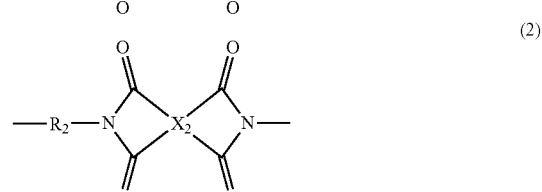

wherein $R_1$ represents a divalent group having from 6 to 22 carbon atoms containing at least one alicyclic hydrocarbon structure; $R_2$ represents a divalent chain aliphatic group having from 5 to 12 carbon atoms; and $X_1$ and $X_2$ each independently represent a tetravalent group having from 6 to 22 carbon atoms containing at least one aromatic ring.

15 Claims, No Drawings

CRYSTALLINE THERMOPLASTIC POLYIMIDE RESIN

CROSS REFERENCE TO RELATED APPLICATIONS

The present application is a 35 U.S.C. §371 national stage patent application of International patent application PCT/JP2013/052572, filed on Feb. 5, 2013, published as WO/2013/118704 on Aug. 15, 2013, the text of which is incorporated by reference, and claims the benefit of the filing date of Japanese application no. 2012-025176, filed on Feb. 8, 2012, the text of which is also incorporated by reference.

TECHNICAL FIELD

The present invention relates to a novel crystalline thermoplastic polyimide resin.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide having crystallinity is further enhanced in the heat resistance, the strength and the chemical resistance thereof, and thus is expected for applications as alternatives of metals or the like.

The major factors for the excellent thermal stability of a polyimide include the high glass transition temperature and the high melting point thereof. In consideration of the long-term heat resistance, the properties thereof have a strong correlation to the glass transition temperature. A material exposed to a high temperature for a prolonged period of time, for example, surroundings of an automobile engine and a packing of a high-temperature reactor, is necessarily prevented from being deteriorated in mechanical strength at a retention temperature thereof. Accordingly, super engineering plastics including a polyimide are often used in the case where a high temperature exceeding 200° C. is applied. A resin having a low glass transition temperature, such as nylon, is inferior in long-term heat resistance to super engineering plastics (see NPL 1). The glass transition temperature is in a temperature range where a mechanical strength is largely decreased in both an amorphous resin and a crystalline resin, and beyond that temperature, even a crystalline resin that is reinforced with a filler or the like may not avoid deterioration of the mechanical strength. Taking as an example polyetheretherketone, which is a highly crystalline resin with a crystallization degree of approximately 30%, the resin that is reinforced with a filler or the like has a deflection temperature under load that is approximately immediately below the melting point, but the mechanical strength thereof is largely decreased around 153° C., the glass transition temperature.

A polyimide has a high glass transition temperature but generally has no melting point appearing in a temperature range lower than the decomposition temperature. Vespel (registered trademark), a highly heat-resistant resin, is molded at a high temperature and a high pressure for a prolonged period of time and the like conditions since it has no melting point below the decomposition temperature, and thus is necessarily expensive due to the difficulty in the molding process thereof (see PTL 1).

For improving the moldability, it is necessary to impart thermoplasticity (i.e., a melting point in a crystalline resin) to a polyimide at a temperature lower than the decomposition temperature. A thermoplastic polyimide may be subjected to injection molding and extrusion molding, has good handling property, has recyclability, and thus may be a material that is considerably useful in industrial-scale production. As described above, however, a polyimide generally has no melting point below the decomposition temperature, and it can be said that a crystalline thermoplastic polyimide, which is capable of being subjected to injection molding and extrusion molding, is a scarce resin in the market.

A commercially available crystalline thermoplastic polyimide capable of being subjected to injection molding or extrusion molding includes Aurum (registered trademark) (Mitsui Chemicals, Inc.) (see PTL 2). The material is a rigid wholly aromatic polyimide but succeeds to have a melting point, which is generally difficult to be observed, at a temperature lower than the decomposition temperature by introducing plural flexible ether bonds and meta structures into the structure. The material has a large number of flexible structures but has a high melting point (388° C.), which is peculiar to a polyimide, and in particular, a higher temperature exceeding 400° C. is required for molding the material (see NPL 2). Furthermore, the crystallization rate thereof is far smaller than an ordinary injection molding cycle, and it can be said that there are difficulties in restrictions on equipments and handling property.

For improving the moldability, there have been some attempts of decreasing a melting point of a polyimide, but in practice, decreasing the melting point also decreases the glass transition temperature, thereby extinguishing the high glass transition temperature, which is peculiar to a polyimide. There is an empirical rule that the melting point and the glass transition temperature have a certain distance (in general, there is often an approximate relationship, (glass transition temperature)/(melting point)=⅔ in terms of absolute temperature), and therefore decreasing the melting point for improving the moldability generally also decreases the glass transition temperature, which is one of the basic factors of the heat resistance.

There has been reported, for a wholly aromatic polyimide, a polyimide having a melting point and a glass transition temperature that are very close to each other, which breaks the aforementioned relationship (herein, a polyimide having simultaneously a melting point of 360° C. or less and a glass transition temperature of 200° C. or more is referred to as a polyimide having a low melting point and a high glass transition temperature). For example, Vladimir, et al. have reported that a polyimide having a particular structure has very close property values, i.e., a melting point of 320° C. and a glass transition temperature of 204° C. (see NPL 3). However, the polyimide shows reproducible crystallinity only under the special condition, i.e., in the presence of carbon nanotubes mixed therewith, and therefore it is difficult to recognize the polyimide as a crystalline resin. Mitsui Chemicals, Inc. has reported that a copolymer polyimide having two kinds of repeating unit structures shown by the following formula (a) has further close property values, i.e., a melting point of 281° C. and a glass transition temperature of 229° C., while the values vary depending on the composition (see PTL 3).

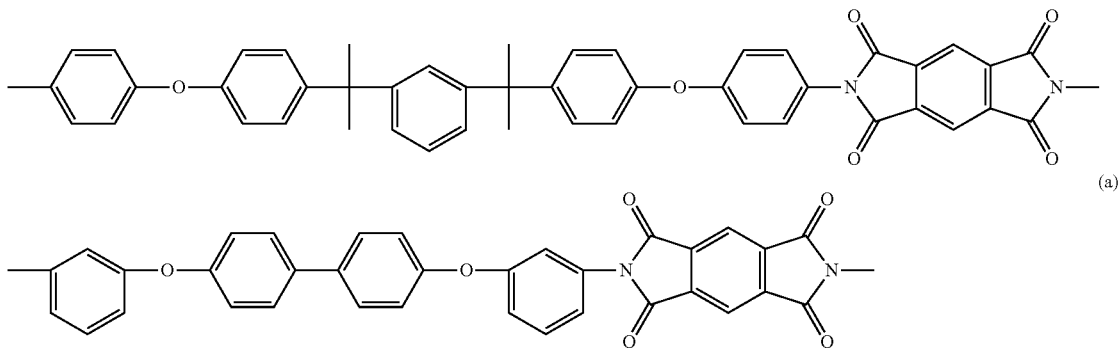

(a)

However, attempting to impart a melting point lower than the decomposition temperature to a wholly aromatic polyimide requires the use of highly special monomers that have low versatility and difficulty in synthesis. The synthesis methods of the monomers in PTL 3 result in necessity of many process steps, prolonged periods of time, and special raw materials (see PTL 4). It is necessarily difficult to decrease the melting point in the case where a rigid aromatic structure is incorporated into both the acid component and the diamine component of the polyimide, which originally has a rigid structure, and as a result, there is less possibility of practical mass production in the market. For a fact, only Aurum (registered trademark) mentioned above has been known as a wholly aromatic crystalline thermoplastic polyimide in the large market exceeding several tens of tons.

On the other hand, there have been many cases where a crystalline polyimide is obtained from monomers that have high versatility, i.e., that may be easily synthesized or available, which are confirmed in a semi-aromatic polyimide system using an aliphatic diamine (herein, the semi-aromatic polyimide is defined as a polyimide obtained from an aromatic tetracarboxylic acid compound and an aliphatic diamine compound).

In particular, on synthesizing a semi-aromatic polyimide with a straight-chain aliphatic diamine and an aromatic tetracarboxylic acid compound, the straight-chain aliphatic diamine moiety forms a soft segment, whereas the aromatic tetracarboxylic acid moiety forms a hard segment, which may result in high crystallinity in some cases (see PTL 3). For decreasing the melting point for improving the moldability in this system, it is necessary to extend the chain length of the soft segment moiety, i.e., the chain aliphatic moiety. There is generally a tendency that the melting point is decreased inversely proportional to the chain length (see NPL 4).

In the semi-aromatic polyimide system, however, the glass transition temperature is largely decreased along with the decrease of the melting point according to the aforementioned general rule, thereby extinguishing the high glass transition temperature, which is peculiar to the polyimide. In consideration of the chemical structure, the phenomenon may be caused by such a fact that the introduction of the flexible structure increases the degree of freedom of the molecular chain movement and activates the thermal motion of the molecules. Accordingly, the semi-aromatic polyimide using an aliphatic diamine having a practical thermal property is difficult to be distinguished from the other resins including nylons and esters, and thus has a low competitive ability in the market.

CITATION LIST

Patent Literature

[PTL 1] JP-A-2005-28524
[PTL 2] JP-A-62-236858
[PTL 3] JP-A-6-157751
[PTL 4] Japanese Patent No. 2,530,919

Non-Patent Literature

[NPL 1] Plastics, 52, p. 95, 2001
[NPL 2] AURUM, Technical Information, G-06
[NPL 3] Jour. Polym. Sci.: Part A: Polym. Chem., 701, 34, 1996
[NPL 4] Macromol. Rapid Commun., 885, 26, 2005

SUMMARY OF INVENTION

Technical Problem

An object of the present invention is to provide a crystalline thermoplastic copolyimide resin that solves the problems associated with the related art.

Solution to Problem

As a result of earnest investigations on thermoplastic polyimide resins by the present inventors, it has been found that a thermoplastic polyimide resin containing particular plural kinds of polyimide structural units combined at a particular ratio has a peculiar capability, i.e., a low melting point of 360° C. or less and a high glass transition temperature of 200° C. or more, and thus the present invention has been completed.

Accordingly, the present invention provides a thermoplastic polyimide resin containing a repeating structural unit represented by the following formula (1) and a repeating structural unit represented by the following formula (2), a content ratio of the repeating structural unit of formula (1) with respect to the total of the repeating structural unit of formula (1) and the repeating structural unit of formula (2) being from 40 to 70% by mol:

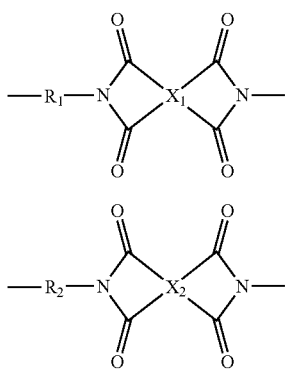

wherein $R_1$ represents a divalent group having from 6 to 22 carbon atoms containing at least one alicyclic hydrocarbon structure; $R_2$ represents a divalent chain aliphatic group having from 5 to 12 carbon atoms; and $X_1$ and $X_2$ each independently represent a tetravalent group having from 6 to 22 carbon atoms containing at least one aromatic ring.

Advantageous Effects of Invention

According to the present invention, a crystalline thermoplastic polyimide having simultaneously a low melting point of 360° C. or less and a high glass transition temperature of 200° C. or less may be provided.

DESCRIPTION OF EMBODIMENTS

The thermoplastic polyimide resin of the present invention contains a repeating structural unit represented by the following formula (1) and a repeating structural unit represented by the following formula (2), and the content ratio of the repeating structural unit of formula (1) with respect to the total of the repeating structural unit of formula (1) and the repeating structural unit of formula (2) is from 40 to 70% by mol:

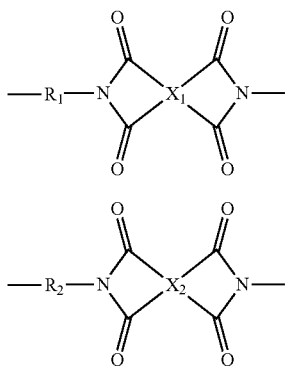

wherein $R_1$ represents a divalent group having from 6 to 22 carbon atoms containing at least one alicyclic hydrocarbon structure; $R_2$ represents a divalent chain aliphatic group having from 5 to 12 carbon atoms; and $X_1$ and $X_2$ each independently represent a tetravalent group having from 6 to 22 carbon atoms containing at least one aromatic ring.

The repeating structural unit of formula (1) will be described in detail below.

$R_1$ represents a divalent group having from 6 to 22 carbon atoms containing at least one alicyclic hydrocarbon structure.

The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

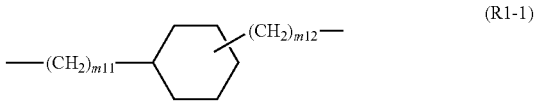

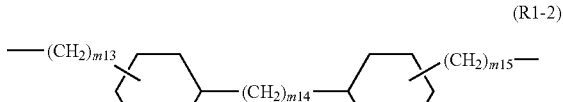

wherein $m_{11}$ and $m_{12}$ each independently represent an integer of from 0 to 2, and preferably 0 or 1; and $m_{13}$ to $m_{15}$ each independently represent an integer of from 0 to 2, and preferably 0 or 1.

$R_1$ is particularly preferably a divalent group represented by the following formula (R1-3):

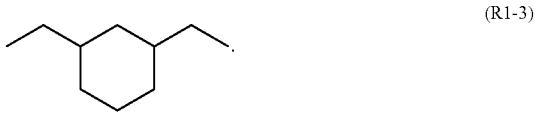

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

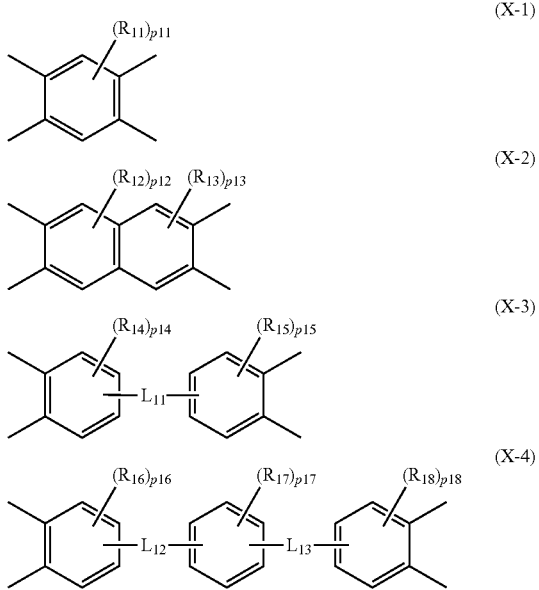

(X-1)

(X-2)

(X-3)

(X-4)

wherein $R_{11}$ to $R_{18}$ each independently represent an alkyl group having from 1 to 4 carbon atoms; $p_{11}$ to $p_{13}$ each independently represent an integer of from 0 to 2, and preferably 0; $p_{14}$, $p_{15}$, $p_{16}$ and $p_{18}$ each independently represent an integer of from 0 to 3, and preferably 0; $p_{17}$ represents an integer of from 0 to 4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 6 to 22 carbon atoms.

Similarly, $L_{11}$, $R_{14}$, $R_{15}$, $p_{14}$ and $p_{15}$ in the formula (X-3) are selected in such a manner that the tetravalent group represented by the formula (X-3) has from 6 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 6 to 22 carbon atoms.

$X_1$ is particularly preferably a tetravalent group represented by the following formula (X-5) or (X-6):

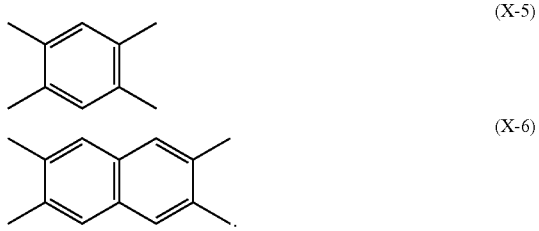

(X-5)

(X-6)

The repeating structural unit of formula (2) will be described in detail below.

$R_2$ represents a divalent chain aliphatic group having from 5 to 12 carbon atoms. The chain aliphatic group herein means a group derived from a chain aliphatic compound, and the chain aliphatic compound may be either saturated or unsaturated, may be in the form of either a straight chain or a branched chain, and may contain a hetero atom, such as an oxygen atom.

$R_2$ is preferably an alkylene group having from 5 to 12 carbon atoms, and more preferably an alkylene group having from 6 to 10 carbon atoms. The alkylene group may be either a straight-chain alkylene group or a branched alkylene group, and is preferably a straight-chain alkylene group.

$R_2$ is particularly preferably a hexamethylene group.

Another preferred embodiment of $R_2$ is a divalent chain aliphatic group having from 5 to 12 carbon atoms containing an ether group. Preferred examples of the group include a divalent group represented by the following formula (R2-1) or (R2-2):

(R2-1)

(R2-2)

wherein $m_{21}$ and $m_{22}$ each independently represent an integer of from 1 to 11, and preferably from 2 to 6; and $m_{23}$ to $m_{25}$ each independently represent an integer of from 1 to 10, and preferably from 2 to 4.

$R_2$ is a divalent chain aliphatic group having from 5 to 12 carbon atoms, and therefore $m_{21}$ and $m_{22}$ in the formula (R2-1) are selected in such a manner that the divalent group represented by the formula (R2-1) has from 5 to 12 carbon atoms, i.e., $m_{21}+m_{22}$ is from 5 to 12.

Similarly, $m_{23}$ to $m_{25}$ in the formula (R2-2) are selected in such a manner that the divalent group represented by the formula (R2-2) has from 5 to 12 carbon atoms, i.e., $m_{23}+m_{24}+m_{25}$ is from 5 to 12.

$X_2$ is defined similarly to $X_1$ in the formula (1), and preferred embodiments thereof are also the same.

The content ratio of the repeating structural unit of formula (1) with respect to the total of the repeating structural unit of formula (1) and the repeating structural unit of formula (2) is from 40 to 70% by mol. In the case where the content ratio of the repeating structural unit of formula (1) is in the above-described range, the thermoplastic polyimide resin has a large crystallization rate with a crystallization half-time of 60 seconds or less, and thus the thermoplastic polyimide resin of the present invention may be sufficiently crystallized in an ordinary injection molding cycle (60 seconds or less). The content ratio of the repeating structural unit of formula (1) with respect to the total of the repeating structural unit of formula (1) and the repeating structural unit of formula (2) is preferably from 40 to 60% by mol.

The content ratio of the total of the repeating structural unit of formula (1) and the repeating structural unit of formula (2) with respect to the total repeating units constituting the thermoplastic polyimide resin of the present invention is preferably from 50 to 100% by mol, and more preferably from 70 to 100% by mol.

The thermoplastic polyimide resin of the present invention may further contain a repeating structural unit represented by the following formula (3), and in this case, the content ratio of the repeating structural unit of formula (3) with respect to the total of the repeating structural unit of formula (1) and the repeating structural unit of formula (2) is 25% by mol or less. The lower limit thereof is not particularly limited but needs to exceed 0% by mol.

The content ratio is preferably 5% by mol or more, and more preferably 10% by mol or more, in consideration of enhancement of the heat resistance, and is preferably 20% by mol or less, and more preferably 15% by mol or less, in consideration of maintenance of the crystallinity.

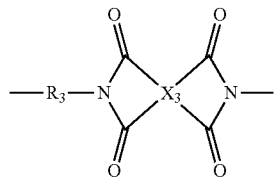

(3)

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

$R_3$ is preferably a divalent group represented by the following formula (R3-1) or (R3-2):

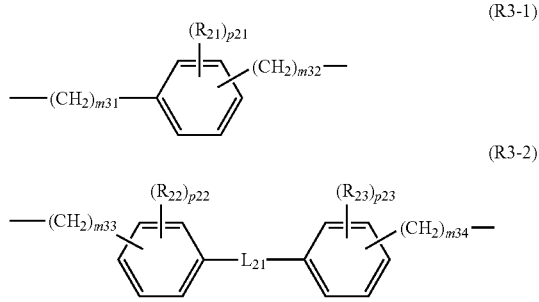

(R3-1)

(R3-2)

wherein $m_{31}$ and $m_{32}$ each independently represent an integer of from 0 to 2, and preferably 0 or 1; $m_{33}$ and $m_{34}$ each independently represent an integer of from 0 to 2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of from 0 to 4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 6 to 22 carbon atoms.

$X_3$ is defined similarly to $X_1$ in the formula (1), and preferred embodiments thereof are also the same.

The content ratio of the repeating structural unit of formula (3) with respect to the total repeating units constituting the thermoplastic polyimide resin of the present invention is 25% by mol or less. The lower limit thereof is not particularly limited but needs to exceed 0% by mol.

The content ratio is preferably 5% by mol or more, and more preferably 10% by mol or more, in consideration of enhancement of the heat resistance, and is preferably 20% by mol or less, and more preferably 15% by mol or less, in consideration of maintenance of the crystallinity.

The thermoplastic polyimide resin of the present invention preferably has a melting point of 360° C. or less and a glass transition temperature of 200° C. or more.

The thermoplastic polyimide resin of the present invention preferably has an exothermic amount of the crystallization exothermic peak of 5 mJ/mg or more, the crystallization exothermic peak being observed when the resin is melted and then cooled at a cooling rate of 10° C./min or more in a differential scanning calorimeter.

The thermoplastic polyimide resin of the present invention may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxyl groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid and 1,4,5,8-naphthalenetetracarboxylic acid. Among these, pyromellitic acid is particularly preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'- diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.02,6]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either a straight chain or a branched chain, and preferably has from 5 to 12 carbon atoms. The linear moiety having from 5 to 12 carbon atoms may contain an ether bond in the course thereof. Preferred examples of the chain aliphatic diamine include 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine and 2,2'-(ethylenedioxy)bis(ethyleneamine)

The chain aliphatic diamine may be used as a sole compound or as a mixture of plural kinds thereof within the range of the present invention with no particular problem. Among these, a chain aliphatic diamine having from 6 to 10 carbon atoms is preferably used, and 1,6-hexamethylenediamine is particularly preferably used.

In the production of the thermoplastic polyimide resin of the present invention, the molar ratio of the charged amount of the diamine containing at least one alicyclic hydrocarbon structure with respect to the total amount of the diamine containing at least one alicyclic hydrocarbon structure and the chain aliphatic diamine is preferably from 40 to 70% by mol.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25% by mol or less. The lower limit thereof is not particularly limited but needs to exceed 0% by mol.

The molar ratio is preferably 5% by mol or more, and more preferably 10% by mol or more, in consideration of enhancement of the heat resistance, and is preferably 20% by mol or less, and more preferably 15% by mol or less, in consideration of maintenance of the crystallinity.

In the production of the thermoplastic polyimide resin of the present invention, the charged amount ratio of the tetracarboxylic acid component and the diamine component is preferably from 0.9 to 1.1 mol of the diamine component per 1 mol of the tetracarboxylic acid component.

In the production of the thermoplastic polyimide resin of the present invention, an end capping agent may be mixed in addition to the tetracarboxylic acid component and the diamine component. The end capping agent is preferably a monoamine compound or a dicarboxylic acid compound. The charged amount of the end capping agent to be introduced is preferably from 0.0001 to 0.1 mol, and particularly preferably from 0.001 to 0.06 mol, per 1 mol of the aromatic tetracarboxylic acid and/or the derivative thereof. Preferred examples of the monoamine end capping agent include methylamine, ethylamine, propylamine, butylamine, benzylamine, 4-methylbenzylamine, 4-ethylbenzylamine, 4-dodecylbenzylamine, 3-methylbenzylamine, 3-ethylbenzylamine, aniline, 3-methylaniline and 4-methylaniline. Among these, benzylamine and aniline are preferably used. The dicarblxylic acid end capping agent is preferably a dicarboxylic acid compound, which may partially have a closed ring structure with no particular problem. Preferred examples thereof include phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid and 4-cyclohexene-1,2-dicarboxylic acid. Among these, phthalic acid and phthalic anhydride are preferably used.

As a polymerization method for producing the thermoplastic polyimide resin of the present invention, a known polymerization method for producing a known polyimide may be applied, and examples thereof include solution polymerization, melt polymerization, solid phase polymerization and suspension polymerization while not particularly limited. Among these, suspension polymerization under a high temperature condition using an organic solvent is preferably employed. On performing suspension polymerization under a high temperature condition, the polymerization is preferably performed at 150° C. or more, and particularly preferably at from 180 to 250° C. The polymerization time may vary depending on the monomers used, and is preferably approximately from 2 to 6 hours. Examples of the solvent used include water, benzene, toluene, xylene, acetone, hexane, heptane, chlorobenzene, methanol, ethanol, n-propanol, isopropanol, methyl glycol, methyl triglycol, hexyl glycol, phenyl glycol, ethylene glycol, ethylene glycol monomethyl ether, ethylene glycol monoisopropyl ether, ethylene glycol monoisobutyl ether, 2-(2-methoxyethoxy)ethanol, methylpropylene glycol, methylpropylene diglycol, propylpropylene glycol, phenylpropylene glycol, 2-(2-methoxyethoxy) ethanol, N-methyl-2-pyrrolidone, N,N-dimethylacetamide, N,N-diethylacetamide, N,N-dimethylformamide, N,N-diethylformamide, N-methylcaprolactam, hexamethylphosphoramide, tetramethylene sulfone, dimethylsulfoxide, o-cresol, m-cresol, p-cresol, phenol, p-chlorophenol, 2-chloro-4-hydroxytoluene, diglyme, triglyme, tetraglyme, dioxane, γ-butyrolactone, dioxolane, cyclohexanone, cyclopentanone, dichloromethane, chloroform, 1,2-dichlorethane, 1,1,2-trichloroethane, dibromomethane, tribromomethane, 1,2-dibromoethane, 1,1,2-tribromoethane, and mixtures of two or more kinds thereof. Among these, a mixed solvent of 2-(2-methoxyethoxy)ethanol and water is preferably used.

The thermoplastic polyimide resin of the present invention is melted essentially at a temperature of 360° C. or less and may be subjected to various kinds of heat molding. Examples of the heat molding method include injection molding, extrusion molding, blow molding, heat press molding, vacuum molding, pneumatic molding, laser molding, welding and heat adhesion, and the resin may be molded by any molding method that includes a heat melting step. Examples of the shape of the molded article include an injection molded article, an extrusion molded article, a film, a sheet, a strand, pellets, fibers, a round bar, a rectangular bar, a pipe and a tube. The thermoplastic polyimide resin of the present invention may be used as a heat-resistant adhesive by applying heat and pressure, and thus may be applied to a flexible board, a copper-clad laminated plate and the like.

The thermoplastic polyimide resin of the present invention may be used after mixing with another resin depending on the purpose thereof Examples of the resin include polyetheretherketone, polyetherimide, polysulfone, polyphenylenesulfide, polyamide, polyamideimide, polyphenyleneether, polyarylate, polyester, polycarbonate, a liquid crystal polymer and polyimide other than the present invention.

EXAMPLE

The present invention will be described in more detail with reference to examples below, but the present invention is not limited thereto. The physical properties in the examples were measured and evaluated in the following manners.

The logarithmic viscosity μ was measured in such a manner that the resulting polyimide was dried at from 190 to 200° C. for 2 hours, and 0.100 g of the polyimide was dissolved in 20 mL of concentrated sulfuric acid (96%, available from Kanto Chemical Co., Inc.), and measured at 30° C. with a Cannon-Fenske viscometer. The logarithmic viscosity μ was obtained according to the following expression.

$$\mu = \ln(t_s/t_0)/C$$

$t_0$: elapsed time for flowing solvent
$t_s$: elapsed time for flowing dilute polymer solution
C: 0.5 g/dL The melting point, the glass transition temperature and the crystallization temperature of the thermoplastic polyimide resin were measured with a differential scanning calorimeter (DSC-6220, produced by SII Nanotechnology, Inc.). The thermoplastic polyimide resin was subjected to the following thermal history in a nitrogen atmosphere. The condition of the thermal history included the first heating (heating rate: 10° C./min), then cooling (cooling rate: 20° C./min), and then second heating (heating rate: 10° C./min) The melting point in the present invention was determined by reading the peak top value of the endothermic peak observed in the first heating or the second heating. The glass transition temperature was determined by reading the value observed in the first heating or the second heating. The crystallization temperature was determined by reading the peak top value of the exothermic peak observed in the first cooling or the second heating. In the example, the melting point in the first heating is expressed as $Tm_0$, the melting point in the second heating is expressed as Tm, the glass transition temperature in the first heating is expressed as $Tg_0$, the glass transition temperature in the second heating is expressed as Tg, the crystallization temperature in the first heating is expressed as $Tc_0$, and the crystallization temperature in the first cooling is expressed as Tc (provided that in the case where the crystallization rate is small, and no crystallization temperature is observed in the first cooling, but the crystallization temperature is observed in the second heating, the crystallization temperature in the second heating is expressed as Tc).

The crystallization half-time was evaluated with a differential scanning calorimeter (DSC-6220, produced by SII Nanotechnology, Inc.). A resin having a crystallization half-time of 20 seconds or less was measured under such conditions that the resin was held at 420° C. for 10 minutes (for a resin having a melting point exceeding 400° C., was held at 460° C. for 10 minutes) for melting the resin completely, and then quenched at a cooling rate of 70° C./min, during which the time required from the appearance of the crystallization peak observed to the peak top thereof is calculated for determining the crystallization half-time. A resin having a crystallization half-time of 20 seconds or more was measured under such conditions that the resin was held at 420° C. for 10 minutes for melting the resin completely, and then held at a temperature higher than the glass transition temperature and lower than the melting point, during which the time required from the appearance of the crystallization peak observed to the peak top thereof is calculated for determining the crystallization half-time.

The 1% decomposition temperature was such a temperature that a weight loss of 1% with respect to the initial weight occurred on measuring at a heating rate of 10° C./min in the air atmosphere with a thermogravimetry/differential thermal analyzer (TG/DTA-6200, produced by SII Nanotechnology, Inc.).

The IR measurement was performed with JIR-WINSPEC 50, produced by JEOL, Ltd.

The polyimide resin of the present invention may be determined for the monomer composition thereof, for example, by performing depolymerization shown below.

A 5 mL portion was measured off from a 1M sodium hydroxide solution, which was obtained by mixing 4.0 g of sodium hydroxide, 50 mL of water and 50 mL of methanol, to which 100 mg of the polyimide in the form of solid was added, and then the mixture was heated to 240° C. for 1 hour in a pressure resistant vessel, thereby performing depolymerization.

The resulting solution was extracted with chloroform and water, thereby separating the solutions of the monomers thus depolymerized. The compositional ratio of the monomers was determined in such a manner that the solution was separated by gas chromatography (HP6890, produced by Hewlett-Packard Corporation) with a column (HP-5, produced by Agilent Technologies, Inc.) (heating condition: maintained at 50° C. for 10 minutes and then heated to 300° C. at 10° C./min), and the area ratios of the monomers were calculated. The tetracarboxylic acid component was observed in the form of a methyl ester.

Example 1

1,200 g of 2-(2-methoxyethoxy)ethanol (produced by Kishida Chemical Co., Ltd.), 300 g of ion exchanged water, 83.96 g (0.5902 mol) of 1,3-bis(aminomethyl)cyclohexane (produced by Mitsubishi Gas Chemical Co., Inc.), 54.86 g (0.4722 mol) of 1,6-hexamethylenediamine (produced by Wako Pure Chemical Industries, Ltd.), 23.64 g (0.1180 mol) of 4,4'-diaminodiphenyl ether (produced by Wakayama Seika Kogyo Co., Ltd.), 2.53 g (0.0236 mol) of benzylamine (produced by Kanto Chemical Co., Inc.) and 300.0 g (1.180 mol) of pyromellitic acid (produced by Mitsubishi Gas Chemical Co., Inc.) were introduced in a 3 L autoclave and agitated uniformly, and after sealing, the interior was replaced by nitrogen. The mixture was heated to 195° C., and after reaching a gauge pressure of 0.9 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 339 g of polyimide 1. The measurement of the polyimide 1 with DSC revealed that only $Tm_0$ was observed at 338° C. in the first heating, but $Tg_0$ and $Tc_0$ were not clearly observed (which meant that the polyimide had high crystallinity). In the cooling, Tc was observed at 308° C. (exothermic amount: 12.0 mJ/mg), which confirmed that the polyimide had high crystallinity. In the second heating, Tg was observed at 229° C., and Tm was observed at 335° C. The crystallization half-time measured was 20 seconds or less. The 1% decomposition temperature was 413° C., and the logarithmic viscosity was 0.56 dL/g. The measurement of the IR spectrum showed the characteristic absorption of an imide ring v(C=O) observed at 1,771 and 1,699 (cm$^{-1}$).

The calculation of the monomer compositional ratio by depolymerization showed a ratio pyromellitic acid/1,3-bis (aminomethyl)cyclohexane/1,6-hexamethylenediamine/4, 4'-diaminodiphenyl ether/benzylamine of 100/51.9/43.5/9.6/2.0, which confirmed that the polyimide was polymerized at the same ratio as the monomer charged molar ratio.

Example 2

8 g of 2-(2-methoxyethoxy)ethanol (produced by Kishida Chemical Co., Ltd.), g of ion exchanged water, 0.5037 g (0.003541 mol) of 1,3-bis(aminomethyl)cyclohexane (produced by Mitsubishi Gas Chemical Co., Inc.), 0.2743 g (0.002361 mol) of 1,6-hexamethylenediamine (produced by Wako Pure Chemical Industries, Ltd.), 1.50 g (0.005902 mol) of pyromellitic acid (produced by Mitsubishi Gas Chemical Co., Inc.) and 0.01264 g (0.0001180 mol) of benzylamine (produced by Kanto Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 1.75 g of polyimide 2. The measurement of the polyimide 2 with DSC revealed that only $Tm_0$ was observed at 345° C. in the first heating, but $Tg_0$ and $Tc_0$ were not clearly observed (which meant that the polyimide had high crystallinity). In the cooling, Tc was observed at 294° C. (exothermic amount: 11.3 mJ/mg), which confirmed that the polyimide had high crystallinity. In the second heating, Tg was observed at 224° C., and Tm was observed at 344° C. The crystallization half-time measured was 20 seconds or less. The resin was not dissolved completely in concentrated sulfuric acid, and thus the logarithmic viscosity was not able to be measured. The measurement of the IR spectrum showed the characteristic absorption of an imide ring v(C=O) observed at 1,771 and 1,699 (cm$^{-1}$).

Example 3

8 g of 2-(2-methoxyethoxy)ethanol (produced by Kishida Chemical Co., Ltd.), g of ion exchanged water, 0.588 g (0.004131 mol) of 1,3-bis(aminomethyl)cyclohexane (produced by Mitsubishi Gas Chemical Co., Inc.), 0.206 g (0.00177 mol) of 1,6-hexamethylenediamine (produced by Wako Pure Chemical Industries, Ltd.), 1.50 g (0.005902 mol) of pyromellitic acid (produced by Mitsubishi Gas Chemical Co., Inc.) and 0.0126 g (0.0001180 mol) of benzylamine (produced by Kanto Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 1.73 g of polyimide 3. The measurement of the polyimide 3 with DSC revealed that only $Tm_0$ was observed at 339° C. in the first heating, but $Tg_0$ and $Tc_0$ were not clearly observed (which meant that the polyimide had high crystallinity). Tc was not observed in the cooling, and in the second heating, Tc was observed at 278° C. (exothermic amount: 9.8 mJ/mg). In the second heating, Tg was observed at 209° C., and Tm was observed at 337° C. The crystallization half-time measured was 100 seconds or more and 120 seconds or less. The resin was not dissolved completely in concentrated sulfuric acid, and thus the logarithmic viscosity was not able to be measured. The measurement of the IR spectrum showed the characteristic absorption of an imide ring v(C=O) observed at 1,771 and 1,699 (cm$^{-1}$).

Example 4

8 g of 2-(2-methoxyethoxy)ethanol (produced by Kishida Chemical Co., Ltd.), g of ion exchanged water, 0.336 g (0.002361 mol) of 1,3-bis(aminomethyl)cyclohexane (produced by Mitsubishi Gas Chemical Co., Inc.), 0.411 g (0.003541 mol) of 1,6-hexamethylenediamine (produced by Wako Pure Chemical Industries, Ltd.), 1.50 g (0.005902 mol) of pyromellitic acid (produced by Mitsubishi Gas Chemical Co., Inc.) and 0.0126 g (0.0001180 mol) of benzylamine (produced by Kanto Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 1.71 g of polyimide 4. The measurement of the polyimide 4 with DSC revealed that only $Tm_0$ was observed at 358° C. in the first heating, but $Tg_0$ and $Tc_0$ were not clearly observed (which meant that the polyimide had high crystallinity). In the cooling, Tc was observed at 340° C. (exothermic amount: 18.5 mJ/mg), which confirmed that the polyimide had high crystallinity. In the second heating, Tg was observed at 215° C., and Tm was observed at 360° C. The crystallization half-time measured was 20 seconds or less. The resin was not dissolved completely in concentrated sulfuric acid, and thus the logarithmic viscosity was not able to be measured. The measurement of the IR spectrum showed the characteristic absorption of an imide ring v(C=O) observed at 1,771 and 1,699 (cm$^{-1}$).

Example 5

1,200 g of 2-(2-methoxyethoxy)ethanol (produced by Kishida Chemical Co., Ltd.), 300 g of ion exchanged water, 22.39 g (0.1574 mol) of 1,3-bis(aminomethyl)cyclohexane (produced by Mitsubishi Gas Chemical Co., Inc.), 22.87 g (0.1968 mol) of 1,6-hexamethylenediamine (produced by Wako Pure Chemical Industries, Ltd.), 5.83 g (0.03935 mol) of Jeffamine EDR-148 (produced by Huntsman Corporation) and 100.0 g (0.3935 mol) of pyromellitic acid (produced by Mitsubishi Gas Chemical Co., Inc.) were introduced in a 3 L autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 116 g of polyimide 5. The measurement of the polyimide 5 with DSC revealed that only $Tm_0$ was observed at 333° C. in the first heating, but $Tg_0$ and $Tc_0$ were not clearly observed (which meant that the polyimide had high crystallinity). In the cooling, Tc was observed at 255° C. (exothermic amount: 12.2 mJ/mg), which confirmed that the polyimide had high crystallinity. In the second heating, Tg was observed at 207° C., and Tm was observed at 335° C. The crystallization half-time measured was 20 seconds or less. The resin was not dissolved completely in concentrated sulfuric acid, and thus the logarithmic viscosity was not able to be measured. The measurement of the IR spectrum showed the characteristic absorption of an imide ring $\nu(C=O)$ observed at 1,769 and 1,699 ($cm^{-1}$).

Example 6

8 g of 2-(2-methoxyethoxy)ethanol (produced by Kishida Chemical Co., Ltd.), g of ion exchanged water, 0.5037 g (0.003541 mol) of 1,3-bis(aminomethyl)cyclohexane (produced by Mitsubishi Gas Chemical Co., Inc.), 0.4730 g (0.002361 mol) of 1,12-dodecanediamine (produced by Kokura Synthetic Industries, Ltd.), 1.795 g (0.005902 mol) of 1,4,5,8-naphthalenetetracarboxylic acid (produced by Kanto Chemical Co., Inc.) and 0.01264 g (0.0001180 mol) of benzylamine (produced by Kanto Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 2.14 g of polyimide 6. The measurement of the polyimide 6 with DSC revealed that only $Tm_0$ was observed at 355° C. in the first heating, but $Tg_0$ and $Tc_0$ were not clearly observed (which meant that the polyimide had high crystallinity). In the cooling, Tc was observed at 306° C. (exothermic amount: 6.85 mJ/mg), which confirmed that the polyimide had high crystallinity. In the second heating, Tg was observed at 203° C., and Tm was observed at 357° C. The crystallization half-time measured was 20 seconds or less. The resin was not dissolved completely in concentrated sulfuric acid, and thus the logarithmic viscosity was not able to be measured. The measurement of the IR spectrum showed the characteristic absorption of an imide ring $\nu(C=O)$ observed at 1,703 and 1,656 ($cm^{-1}$).

Comparative Example 1

8 g of 2-(2-methoxyethoxy)ethanol (produced by Kishida Chemical Co., Ltd.), 2 g of ion exchanged water, 0.2519 g (0.001771 mol) of 1,3-bis(aminomethyl)cyclohexane (produced by Mitsubishi Gas Chemical Co., Inc.), 0.480 g (0.004131 mol) of 1,6-hexamethylenediamine (produced by Wako Pure Chemical Industries, Ltd.), 1.50 g (0.005902 mol) of pyromellitic acid (produced by Mitsubishi Gas Chemical Co., Inc.) and 0.0126 g (0.0001180 mol) of benzylamine (produced by Kanto Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 1.64 g of polyimide 7. The measurement of the polyimide 7 with DSC revealed that only $Tm_0$ was observed at 386° C. in the first heating, but $Tg_0$ and $Tc_0$ were not clearly observed (which meant that the polyimide had high crystallinity). In the cooling, Tc was observed at 375° C. (exothermic amount: 20.8 mJ/mg), which confirmed that the polyimide had high crystallinity. In the second heating, Tg was observed at 212° C., and Tm was observed at 399° C. The crystallization half-time measured was 20 seconds or less. The resin was not dissolved completely in concentrated sulfuric acid, and thus the logarithmic viscosity was not able to be measured. The measurement of the IR spectrum showed the characteristic absorption of an imide ring $\nu(C=O)$ observed at 1,771 and 1,699 ($cm^{-1}$).

Comparative Example 2

8 g of 2-(2-methoxyethoxy)ethanol (produced by Kishida Chemical Co., Ltd.), 2 g of ion exchanged water, 0.672 g (0.004722 mol) of 1,3-bis(aminomethyl)cyclohexane (produced by Mitsubishi Gas Chemical Co., Inc.), 0.1372 g (0.001180 mol) of 1,6-hexamethylenediamine (produced by Wako Pure Chemical Industries, Ltd.), 1.50 g (0.005902 mol) of pyromellitic acid (produced by Mitsubishi Gas Chemical Co., Inc.) and 0.0126 g (0.0001180 mol) of benzylamine (produced by Kanto Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 1.75 g of polyimide 8. The measurement of the polyimide 8 with DSC revealed that only $Tm_0$ was observed at 346° C. in the first heating, but $Tg_0$ and $Tc_0$ were not clearly observed (which meant that the polyimide had high crystallinity). In the cooling, Tc was not observed. In the second heating, only Tg was observed at 238° C., but Tm and Tc were not observed, which meant no crystallinity shown. The resin was not dissolved completely in concentrated sulfuric acid, and thus the logarithmic viscosity was not able to be measured. The measurement of the IR spectrum showed the characteristic absorption of an imide ring $\nu(C=O)$ observed at 1,771 and 1,699 ($cm^{-1}$).

Comparative Example 3

8 g of 2-(2-methoxyethoxy)ethanol (produced by Kishida Chemical Co., Ltd.), 2 g of ion exchanged water, 0.840 g (0.005902 mol) of 1,3-BAC (produced by Mitsubishi Gas Chemical Co., Inc.) and 1.50 g (0.005902 mol) of pyromellitic acid (produced by Mitsubishi Gas Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 1.76 g of polyimide 9. The measurement of the polyimide 9 with DSC revealed that only $Tm_0$ was observed at 390° C. in the first heating, but $Tg_0$ and $Tc_0$ were not clearly observed (which meant that the polyimide had high crystallinity). In the cooling, Tc was not observed. In the second heating, only Tg was observed at 250° C., but Tm and Tc were not observed, which meant no crystallinity shown. The logarithmic viscosity measured was 0.66 dL/g. The measurement of the IR spectrum showed the characteristic absorption of an imide ring $\nu(C=O)$ observed at 1,771 and 1,699 $(cm^{-1})$.

Comparative Example 4

8 g of 2-(2-methoxyethoxy)ethanol (produced by Kishida Chemical Co., Ltd.), 2 g of ion exchanged water, 0.686 g (0.005902 mol) of 1,6-hexamethylenediamine (produced by Wako Pure Chemical Industries, Ltd.) and 1.50 g (0.005902 mol) of pyromellitic acid (produced by Mitsubishi Gas Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 1.59 g of polyimide 10. The measurement of the polyimide 10 with DSC revealed that only $Tm_0$ was observed at 455° C. in the first heating, but $Tg_0$ and $Tc_0$ were not clearly observed (which meant that the polyimide had high crystallinity). In the cooling, Tc was observed at 389° C. (exothermic amount: 21.5 mJ/mg), which confirmed that the polyimide had high crystallinity. In the second heating, Tg was observed at 210° C. (unclear), and Tm was observed at 416° C. The crystallization half-time measured was 20 seconds or less. The logarithmic viscosity measured was 0.96 dL/g. The measurement of the IR spectrum showed the characteristic absorption of an imide ring $\nu(C=O)$ observed at 1,771 and 1,697 $(cm^{-1})$.

Comparative Example 5

8 g of 2-(2-methoxyethoxy)ethanol (produced by Kishida Chemical Co., Ltd.), 2 g of ion exchanged water, 0.875 g (0.005902 mol) of Jeffamine EDR-148 (produced by Huntsman Corporation) and 1.50 g (0.005902 mol) of pyromellitic acid (produced by Mitsubishi Gas Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 1.79 g of polyimide 11. The measurement of the polyimide 11 with DSC revealed that only $Tm_0$ was observed at 277° C. in the first heating, but $Tg_0$ and $Tc_0$ were not clearly observed (which meant that the polyimide had high crystallinity). In the cooling, Tc was observed at 230° C. (exothermic amount: 19.6 mJ/mg), which confirmed that the polyimide had high crystallinity. In the second heating, Tg was observed at 100° C. (unclear), and Tm was observed at 281° C. The crystallization half-time measured was 20 seconds or less. The logarithmic viscosity measured was 0.15 dL/g. The measurement of the IR spectrum showed the characteristic absorption of an imide ring $\nu(C=O)$ observed at 1,771 and 1,698 $(cm^{-1})$.

Comparative Example 6

8 g of 2-(2-methoxyethoxy)ethanol (produced by Kishida Chemical Co., Ltd.), 2 g of ion exchanged water, 0.840 g (0.005902 mol) of 1,3-BAC (produced by Mitsubishi Gas Chemical Co., Inc.) and 1.795 g (0.005902 mol) of 1,4,5,8-naphthalenetetracarboxylic acid (produced by Kanto Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 1.90 g of polyimide 12. The measurement of the polyimide 12 with DSC revealed that only $Tg_0$ was observed at 278° C. in the first heating, and Tg was observed at 278° C. in the second heating, but $Tm_0$, Tm and Tc were not observed. The resin was not dissolved completely in concentrated sulfuric acid, and thus the logarithmic viscosity was not able to be measured. The measurement of the IR spectrum showed the characteristic absorption of an imide ring $\nu(C=O)$ observed at 1,703 and 1,655 $(cm^{-1})$.

Comparative Example 7

8 g of 2-(2-methoxyethoxy)ethanol (produced by Kishida Chemical Co., Ltd.), 2 g of ion exchanged water, 1.183 g (0.005902 mol) of 1,12-dodecanediamine (produced by Kokura Synthetic Industries, Ltd.) and 1.795 g (0.005902 mol) of 1,4,5,8-naphthalenetetracarboxylic acid (produced by Kanto Chemical Co., Inc.) were introduced in a 20 mL autoclave and agitated uniformly, and after sealing, the interior was replaced by nitrogen. The mixture was heated to 220° C., and after reaching a gauge pressure of 1.3 MPa, the reaction was performed for 2 hours. The reaction product was then collected, filtered, pulverized, rinsed with N-methyl-2-pyrrolidone (Mitsubishi Chemical Corporation) and methanol, and further dried at 190° C. for 10 hours with a drier, thereby providing 2.02 g of polyimide 13. The measurement of the polyimide 13 with DSC revealed that only $Tm_0$ was observed at 304° C. in the first heating, but $Tg_0$ and $Tc_0$ were not clearly observed (which meant that the polyimide had high crystallinity). In the cooling, Tc was observed at 260° C. (exothermic amount: 15.2 mJ/mg), which confirmed that the polyimide had high crystallinity. In the second heating, Tg was observed at 135° C. (unclear), and Tm was observed at 290° C. The logarithmic viscosity measured was 0.39 dL/g. The measurement of the IR spectrum showed the characteristic absorption of an imide ring $\nu(C=O)$ observed at 1,703 and 1,655 $(cm^{-1})$.

TABLE 1

|  |  |  | Example 1 | Example 2 | Example 3 | Example 4 | Example 5 | Example 6 |
|---|---|---|---|---|---|---|---|---|
| Tetra-carboxylic acid component (A) | Kind |  |  |  | PMA |  |  | 1,4,5,8-naphthalene-tetracarboxylic acid |
|  | Charged amount | (mol) | 1.18 | 0.005902 | 0.005902 | 0.005902 | 0.3935 | 0.005902 |
|  | Charged molar ratio | A/(B1 + B2 + B3) |  |  | 1.0 |  |  |  |
| Diamine component 1 (B1) | Kind |  |  |  | 1,3-BAC |  |  |  |
|  | Charged amount | (mol) | 0.5902 | 0.003541 | 0.004131 | 0.002361 | 0.1574 | 0.003541 |
|  | Charged molar ratio | B1/(B1 + B2 + B3) | 0.5 | 0.6 | 0.7 | 0.4 | 0.5 | 0.6 |
| Diamine component 2 (B2) | Kind |  |  |  | HMDA |  |  | DODA |
|  | Charged amount | (mol) | 0.4722 | 0.002361 | 0.00177 | 0.003541 | 0.1968 | 0.002361 |
|  | Charged molar ratio | B2/(B1 + B2 + B3) | 0.4 | 0.4 | 0.3 | 0.6 | 0.4 | 0.4 |
| Diamine component 3 (B3) | Kind |  | ODA | — | — | — | EDR-148 | — |
|  | Charged amount | (mol) | 0.118 | — | — | — | 0.03935 | — |
|  | Charged molar ratio | B3/(B1 + B2 + B3) | 0.1 | — | — | — | 0.1 | — |
| Content ratio of unit of formula (1) to total of unit of formula (1) and unit of formula (2) (mol %) (calculated from charged amounts) |  |  | 55.56 | 60 | 70 | 40 | 50 | 60 |
| Melting point Tm (° C.) |  |  | 335 | 344 | 337 | 360 | 335 | 357 |
| Glass transition temperature Tg (° C.) |  |  | 229 | 224 | 209 | 215 | 207 | 203 |
| Crystallization temperature Tc (° C.) |  |  | 308 | 294 | 278 | 340 | 255 | 306 |
| Crystallization half-time (t) (sec) |  |  | $20 \geq t$ | $20 \geq t$ | $120 \geq t \geq 100$ | $20 \geq t$ | $20 \geq t$ | $20 > t$ |

The abbreviations in the tables have the following meanings.
PMA: pyromellitic acid
1,3-BAC: 1,3-bis(aminomethyl)cyclohexane
HMDA: 1,6-hexamethylenediamine
ODA: 4,4'-diaminodiphenyl ether
DODA: 1,12-dodecanediamine
EDR-148: Jeffamine EDR-148 (produced by Huntsman Corporation)

TABLE 2

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Tetra-carboxylic acid component (A) | Kind |  |  |  | PMA |  |  | 1,4,5,8-naphthalene-tetracarboxylic acid |  |
|  | Charged amount | (mol) |  |  |  | 0.00592 |  |  |  |
|  | Charged molar ratio | A/(B1 + B2) |  |  |  | 1.0 |  |  |  |
| Diamine component 1 (B1) | Kind |  |  | 1,3-BAC |  | HMDA | EDR-148 | 1,3-BAC | DODA |
|  | Charged amount | (mol) | 0.001771 | 0.004722 |  |  | 0.005902 |  |  |
|  | Charged molar ratio | B1/(B1 + B2) | 0.3 | 0.8 |  |  | 1.0 |  |  |
| Diamine component 2 (B2) | Kind |  |  | HMDA |  |  | — |  |  |
|  | Charged amount | (mol) | 0.004131 | 0.00118 |  |  | — |  |  |
|  | Charged molar ratio | B2/(B1 + B2) | 0.7 | 0.2 |  |  | — |  |  |
| Content ratio of unit of formula (1) to total of unit of formula (1) and unit of formula (2) (mol %) (calculated from charged amounts) |  |  | 30 | 80 | 100 | 0 | 0 | 100 | 0 |
| Melting point Tm (° C.) |  |  | 399 | — | — | 416 | 281 | — | 290 |
| Glass transition temperature Tg (° C.) |  |  | 212 | 238 | 250 | 210 | 100 (unclear) | 278 | 135 (unclear) |
| Crystallization temperature Tc (° C.) |  |  | 375 | — | — | 389 | 230 | — | 260 |
| Crystallization half-time (t) (sec) |  |  | $20 \geq t$ | — | — | $20 \geq t$ | $20 \geq t$ | — | $20 \geq t$ |

The symbols in the tables have the following meanings.
"—" in crystallization temperature: crystallinity not shown, no crystallization temperature observed on both cooling and heating
"—" in crystallization half-time: no crystallization temperature observed, unable to obtain crystallization half-time

The invention claimed is:

1. A thermoplastic polyimide resin comprising a repeating structural unit represented by formula (1) and a repeating structural unit represented by formula (2), wherein a content ratio of the repeating structural unit of formula (1) with respect to the total of the repeating structural unit of formula (1) and the repeating structural unit of formula (2) is from 40 to 70% by mol:

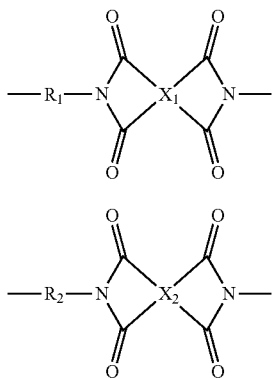
(1)

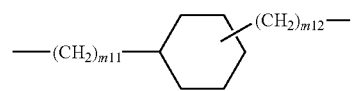
(2)

wherein $R_1$ represents a divalent group having from 6 to 22 carbon atoms comprising an alicyclic hydrocarbon structure;

$R_2$ represents a divalent chain aliphatic group having from 5 to 12 carbon atoms; and $X_1$ and $X_2$ each independently represent a tetravalent group having from 6 to 22 carbon atoms comprising an aromatic ring.

2. The thermoplastic polyimide resin according to claim 1, wherein $R_1$ represents a divalent group represented by formula (R1-1) or (R1-2):

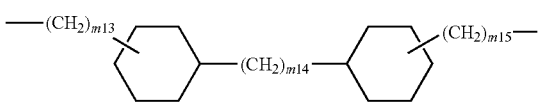
(R1-1)

(R1-2)

wherein $m_{11}$ and $m_{12}$ each independently represent an integer of from 0 to 2; and $m_{13}$ to $m_{15}$ each independently represent an integer of from 0 to 2.

3. The thermoplastic polyimide resin according to claim 2, wherein $R_1$ represents a divalent group represented by formula (R1-3):

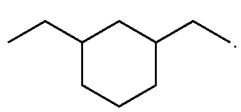
(R1-3)

4. The thermoplastic polyimide resin according to claim 1, wherein $R_2$ represents an alkylene group having from 5 to 12 carbon atoms.

5. The thermoplastic polyimide resin according to claim 4, wherein $R_2$ represents a hexamethylene group.

6. The thermoplastic polyimide resin according to claim 1, wherein $R_2$ represents a divalent group represented by formula (R2-1) or (R2-2):

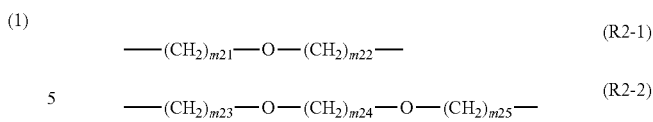

wherein $m_{21}$ and $m_{22}$ each independently represent an integer of from 1 to 11; and $m_{23}$ to $m_{25}$ each independently represent an integer of from 1 to 10.

7. The thermoplastic polyimide resin according to claim 1, wherein $X_1$ and $X_2$ each independently represent a tetravalent group represented by one of formulae (X-1) to (X-4):

(X-1)

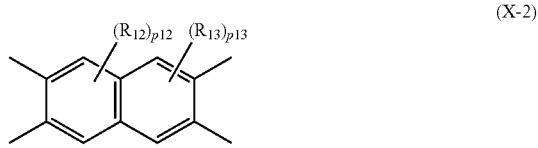
(X-2)

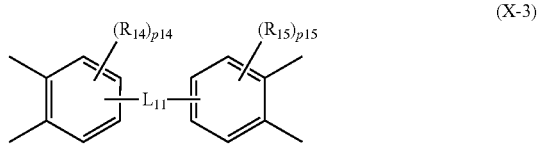
(X-3)

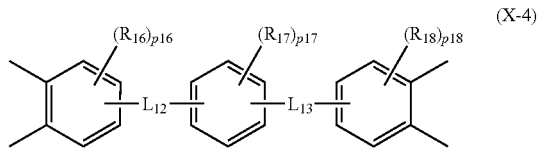
(X-4)

wherein $R_{11}$ to $R_{18}$ each independently represent an alkyl group having from 1 to 4 carbon atoms;

$p_{11}$ to $p_{13}$ each independently represent an integer of from 0 to 2;

$p_{14}$, $p_{15}$, $p_{16}$ and $p_{18}$ each independently represent an integer of from 0 to 3;

$p_{17}$ represents an integer of from 0 to 4; and $L_{11}$ to $L_{13}$ each independently represent a single bond, an ether group, a carbonyl group or an alkylene group having from 1 to 4 carbon atoms.

8. The thermoplastic polyimide resin according to claim 1, further comprising a repeating structural unit represented by formula (3), wherein a content ratio of the repeating structural unit of formula (3) with respect to the total of the repeating structural unit of formula (1) and the repeating structural unit of formula (2) is 25% by mol or less:

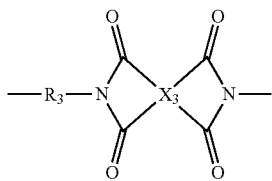
(3)

wherein $R_3$ represents a divalent group having from 6 to 22 carbon atoms comprising an aromatic ring; and $X_3$ represents a tetravalent group having from 6 to 22 carbon atoms comprising an aromatic ring.

9. The thermoplastic polyimide resin according to claim 8, wherein $R_3$ represents a divalent group represented by formula (R3-1) or (R3-2):

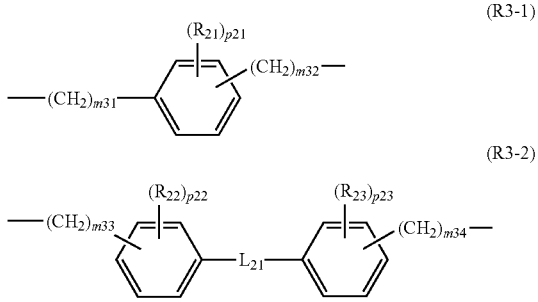

wherein $m_{31}$ and $m_{32}$ each independently represent an integer of from 0 to 2;

$m_{33}$ and $m_{34}$ each independently represent an integer of from 0 to 2;

$R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms;

$P_{21}$, $P_{22}$ and $p_{23}$ each represent an integer of from 0 to 4; and $L_{21}$ represents a single bond, an ether group, a carbonyl group or an alkylene group having from 1 to 4 carbon atoms.

10. The thermoplastic polyimide resin according to claim 8, wherein $X_3$ represents a tetravalent group represented by one of formulae (X-1) to (X-4):

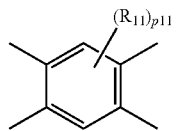
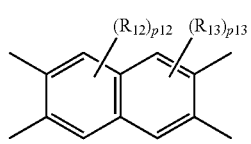
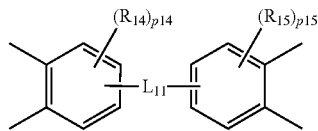
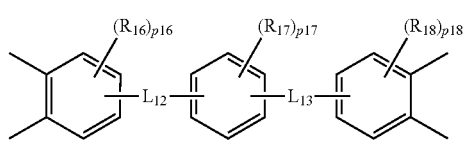

wherein $p_{11}$ to $R_{18}$ each independently represent an alkyl group having from 1 to 4 carbon atoms;

$p_{11}$ to $p_{13}$ each independently represent an integer of from 0 to 2;

$P_{14}$, $P_{15}$, $P_{16}$ and $p_{18}$ each independently represent an integer of from 0 to 3;

$p_{17}$ represents an integer of from 0 to 4; and $L_{11}$ to $L_{13}$ each independently represent a single bond, an ether group, a carbonyl group or an alkylene group having from 1 to 4 carbon atoms.

11. The thermoplastic polyimide resin according to claim 1, having a melting point of 360° C. or less and a glass transition temperature of 200° C. or more.

12. The thermoplastic polyimide resin according to claim 1, having an exothermic amount of a crystallization exothermic peak of 5 mJ/mg or more, the crystallization exothermic peak being observed when the resin is melted and then cooled at a cooling rate of 10° C/min or more in a differential scanning calorimeter.

13. A film comprising the thermoplastic polyimide resin according to claim 1.

14. A fiber comprising the thermoplastic polyimide resin according to claim 1.

15. A heat-resistant adhesive comprising the thermoplastic polyimide resin according to claim 1.

\* \* \* \* \*

UNITED STATES PATENT AND TRADEMARK OFFICE
CERTIFICATE OF CORRECTION

| | | |
|---|---|---|
| PATENT NO. | : 8,927,678 B2 | Page 1 of 1 |
| APPLICATION NO. | : 14/233920 | |
| DATED | : January 6, 2015 | |
| INVENTOR(S) | : Yuuki Sato et al. | |

It is certified that error appears in the above-identified patent and that said Letters Patent is hereby corrected as shown below:

In the Specification,

Column 6, delete line 34 in its entirety and replace with the following:
--wherein $m_{11}$ and $m_{12}$ each independently represent an inte- --

In the Claims,

Column 24, delete line 53 in its entirety and replace with the following:
--$p_{14}, p_{15}, p_{16}$ and $p_{18}$ each independently represent an inte- --

Column 25, delete line 46 in its entirety and replace with the following:
--$p_{21}, p_{22}$ and $p_{23}$ each represent an integer of from 0 to 4; and--

Column 26, delete line 27 in its entirety and replace with the following:
--$R_{11}$ to $R_{18}$ each independently represent an alkyl group--

Column 26, delete line 31 in its entirety and replace with the following:
--$p_{14}, p_{15}, p_{16}$ and $p_{18}$ each independently represent an inte--

Signed and Sealed this
Ninth Day of June, 2015

Michelle K. Lee
*Director of the United States Patent and Trademark Office*

UNITED STATES PATENT AND TRADEMARK OFFICE
CERTIFICATE OF CORRECTION

Page 1 of 1

PATENT NO. : 8,927,678 B2
APPLICATION NO. : 14/233920
DATED : January 6, 2015
INVENTOR(S) : Yuuki Sato et al.

It is certified that error appears in the above-identified patent and that said Letters Patent is hereby corrected as shown below:

On the title page Item (30), Foreign Application Priority Data has been omitted. Item (30) should read:

-- (30)     Foreign Application Priority Data

Feb. 8, 2012     (JP).................. 2012-025176 --

Signed and Sealed this
First Day of September, 2015

Michelle K. Lee
*Director of the United States Patent and Trademark Office*